G. W. PEARSON.
BALING PRESS.
APPLICATION FILED MAR. 26, 1910.
984,488.
Patented Feb. 14, 1911.
3 SHEETS—SHEET 2.
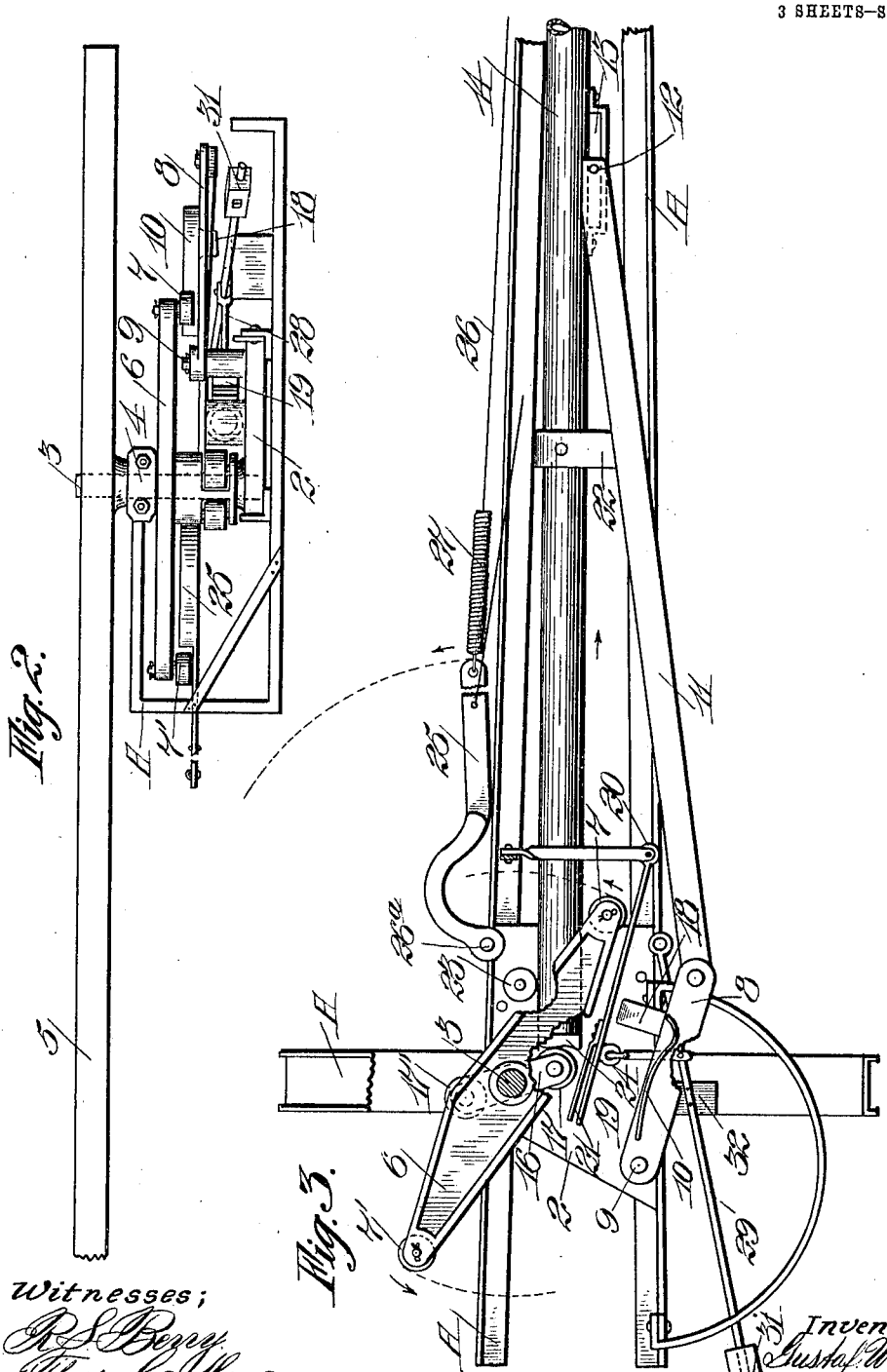
Witnesses;
Inventor.
Gustaf W Pearson G. W. PEARSON.
BALING PRESS.
APPLICATION FILED MAR. 26, 1910.
984,488.
Patented Feb. 14, 1911.
3 SHEETS—SHEET 3.
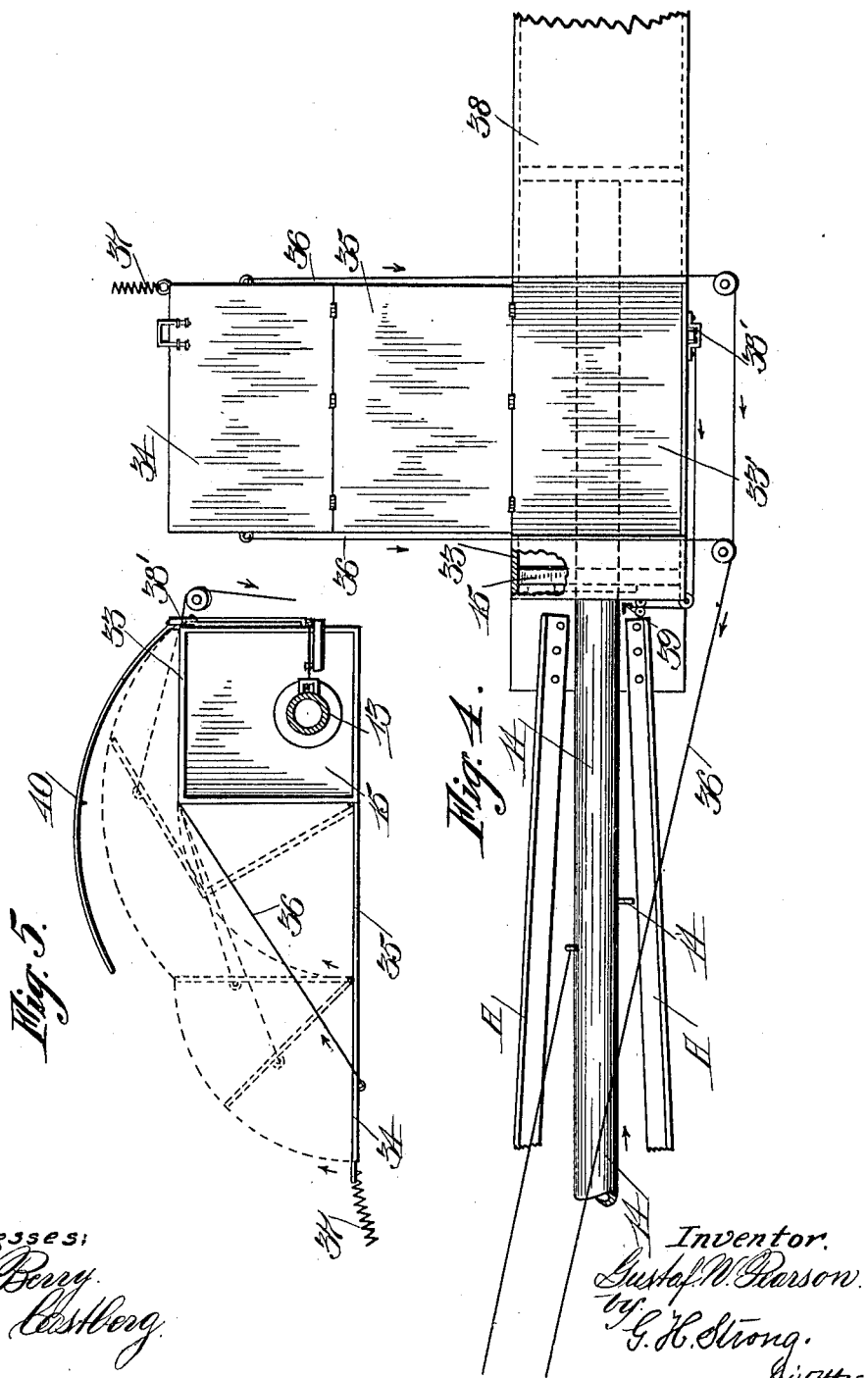

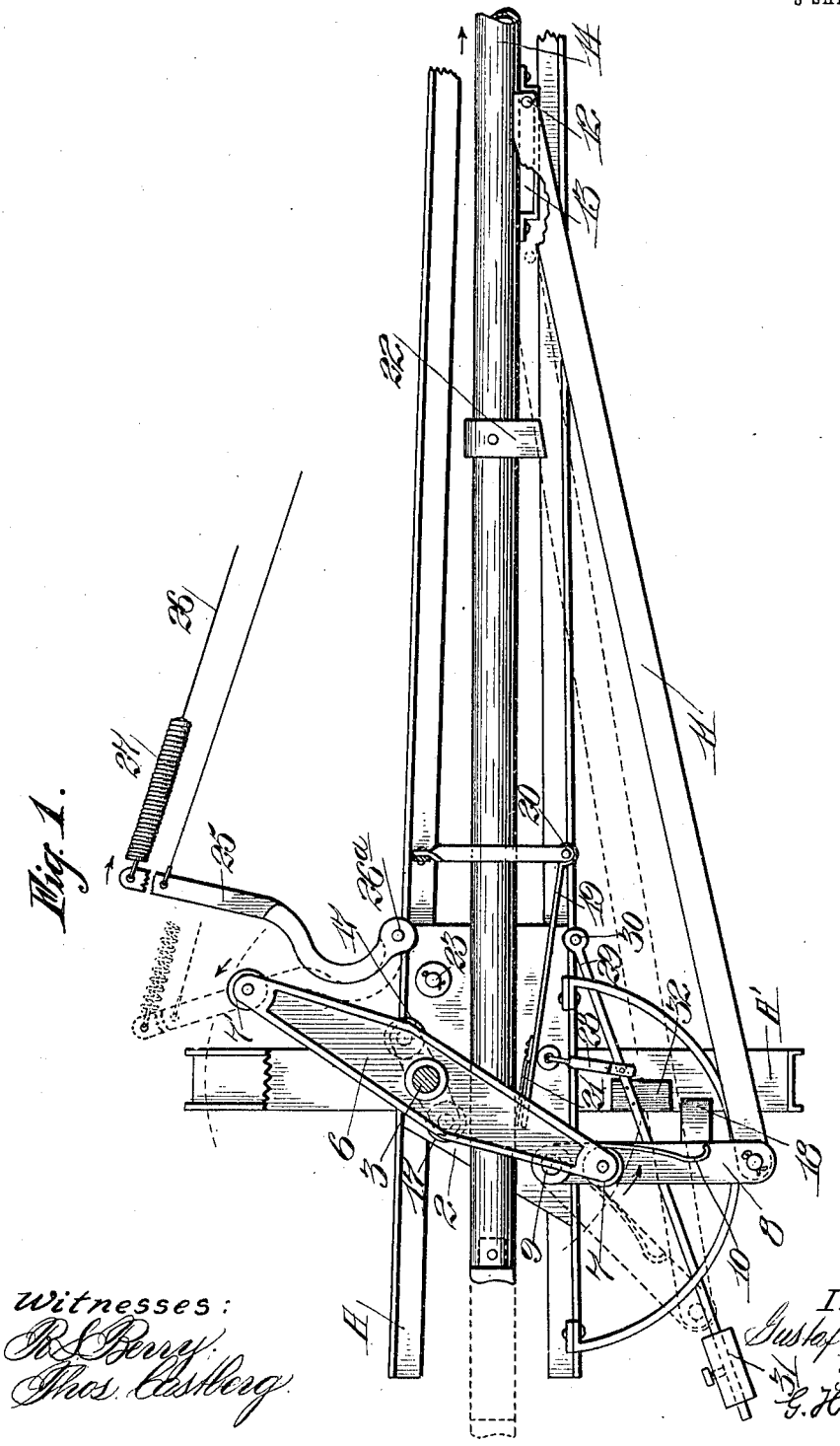

UNITED STATES PATENT OFFICE.

GUSTAF W. PEARSON, OF FRESNO, CALIFORNIA.

BALING-PRESS.

984,488.  Specification of Letters Patent.  Patented Feb. 14, 1911.

Application filed March 26, 1910. Serial No. 551,779.

*To all whom it may concern:*

Be it known that I, GUSTAF W. PEARSON, citizen of the United States, residing at Fresno, in the county of Fresno and State of California, have invented new and useful Improvements in Baling-Presses, of which the following is a specification.

This invention relates to baling-presses of the horizontal or continuous type, such as are usually operated by animal power.

It is the object of this invention to provide a baling-press in which the hay, straw, or other materials to be baled, may be automatically delivered to the feed chamber from the ground level, and in which the feed table of common practice is dispensed with, thereby enabling one man to do the work of two, when baling from the ground or buck-rake, with less effort than where the feed table is employed.

A further object is to provide a baling-press in which the pressing plunger is given a long stroke so as to increase the feeding capacity, and having means by which the force of the plunger is uniformly increased during the pressing operation, so as to equalize the work of the draft animals.

Another object of the invention is to provide a press by means of which hay and the like can be compressed into compact bales suitable for export shipping.

The invention consists of the parts and the construction and combination of parts as hereinafter more fully described and claimed, having reference to the accompanying drawings, in which—

Figure 1 is a plan view of the power end of the press, showing the pitman and parts in an intermediate position. Fig. 2 is an end view of same. Fig. 3 is a plan view with the pitman near its forwardmost position. Fig. 4 is a plan view of the feed chamber and press. Fig. 5 is an end view of same.

In the drawings, A represents the framework of my baling-press, near one end of which is mounted a bed-plate 2. A vertical shaft 3 is journaled in the bed-plate 2 and is retained in alinement by a suitable journal-box 4 near its upper end. The shaft 3 is adapted to be rotated in its bearings in any desired manner, but this rotation is preferably accomplished by securely mounting a sweep 5 on the upper end of the shaft 3, to the outer end of which are hitched suitable draft animals, in the usual manner.

A cross-head 6 is rigidly secured to the shaft 3 at a point beneath the journal-box 4, and has rollers 7—7' mounted on the outer ends thereof, the rollers 7—7' extending beneath the cross-head 6, as shown in Fig. 2, and adapted to engage and act upon a toggle link 8. The link 8 is pivotally mounted at 9 upon a standard formed on the bed-plate 2, and extends below the path of travel of the cross-head 6. An upwardly projecting, curved portion or cam 10 is formed on the link 8, and is so disposed as to be engaged by the rollers 7—7' to move the link 8 forward as the cross-head 6 revolves in the direction of the arrows, the cam 10 being of such length as to be released from the rollers 7—7' when the link has reached its forwardmost position, shown in Fig. 3. The outer end of the link 8 is pivotally connected to a push-beam 11 which extends to a considerable length and is provided with a pin 12 at its outer extremity which is adapted to slide in a slot 13 formed on the pitman or plunger 14.

The plunger 14 is preferably constructed of heavy pipe and is provided at one end with a rectangular head 15, as shown in Fig. 4, which is supported and reciprocal in the pressing chamber or press-box, and the opposite end is slidably supported upon the bed-plate 2.

Normally the plunger 14, push-beam 11 and link 8 occupy the position shown in dotted lines in Fig. 1, with the pin 12 contacting the outer end of the slot 13. When the roller 7 or 7' engages the cam 10 and moves the link 8 forward, the push-beam 11 travels therewith and pushes the plunger 14 forward into the baling or press-box a distance governed by the length of the link 8.

The forward stroke of the plunger 14, just described, is insufficient to thoroughly compress the materials in the baler, especially for export, and to increase the length of the plunger stroke through the cross-head 6 and link 8 would decrease the leverage and require more power to rotate the shaft 3, which would impose a strain upon the draft animals near the end of the compression stroke, and possibly stall the machine at that point. If the plunger 14 was to stop its forward movement at this point, the sudden release of the cross-head 6 from the link 8 would cause the strain on the draft animals to be quickly relieved, thereby making their work uneven and difficult. As a means of increasing the stroke of the plunger, increasing the leverage on the cross-heads and equalizing the work of the draft animals, I employ an auxiliary cross-head 16 which is secured to the shaft 3 beneath the cross-head 6, and is provided with friction rollers 17—17' which are on a plane with the plunger 14. The cross-head 16 is disposed at an angle in relation to the cross-head 6, and is of such length as to engage the end of the plunger 14 and move the latter forward, as will now be described.

When the shaft 3 revolves, and carries the cross-heads 6—16 therewith, the former cross-head moves the plunger 14 forward through the link 8, as before mentioned, and when the intermediate position shown in Fig. 1 is reached, the roller 17 on the cross-head 16 bears against the side of the plunger 14 and shoves the end resting upon the bed-plate 2 to one side, the plunger 14 simultaneously continuing on its forward movement. When the plunger has nearly reached the limit of its stroke as caused by the cross-head 6, the cross-head 16 is then in position to engage the end of the plunger and is caused to do so by reason of the plunger 14 being shoved in front of the roller by the following mechanism: A downwardly inclined plate 18 is mounted on the underside of the link 8 and projects forward thereof a sufficient distance to contact and bear against an arm 19 when the link is near its forwardmost position. This arm 19 is pivoted at 20 to the frame A and has a plate-spring 21 on its outer end which bears against the side of the plunger 14. As the link 8 nears its forward stroke, the plate 18 contacts the lever 19 which in turn bears against the plunger 14 and forces it over in the path of the cross-head 16. At the same time a projection 22 on the plunger 14 is contacted by the push-beam 11, which also aids to throw the plunger 14 in line with the cross-head 16. A friction roller 23 mounted on the bed-plate 2 limits the sidewise movement of the plunger 14, and in conjunction with the projection 22 tends to retain the plunger in alinement. Continued rotation of the short cross-head 16 causes the plunger 14 to complete its forward stroke, which stroke continues until the rollers 17—17' pass the end of the plunger, the slot 13 permitting the plunger to move irrespective of the beam 11. A curved plate 24 is mounted in the end of the plunger against which the rollers 17—17' bear.

As a means of restoring the plunger 14 and the cam link 8 to their normal position after the completion of a forward stroke, a curved lever-arm 25 is pivoted at 26ᵃ to the bed-plate 2 and has a cable 26 secured to its outer end, the opposite end of the cable 26 being suitably secured to the plunger 14 near its forward end, as shown in Fig. 4. A stiff spiral spring 27 is interposed between the lever-arm 25 and cable 26 for a purpose later described.

As the cross-head 16 leaves the end of the plunger 14, the lever 25 is in the position shown in Fig. 3, whereupon the roller 7 or 7' on the cross-head 6 engages the curved lever 25 and carries it backward to the position shown in dotted lines in Fig. 1, which, through the cable 26, returns the plunger to its normal position, the push-beam 11 and link 8 being carried back therewith. A portion of the lever-arm 25 is cut away to permit of the rollers 7—7' leaving at the proper time, so as to release the lever-arm and cable to permit of another stroke of the plunger.

The backward movement of the plunger is retarded by means of a friction brake, which is constructed as follows: The arm 19 is linked at 28 to a lever-rod 29 pivoted at 30 to the frame A. An adjustable weight 31 is mounted on the outer end of the lever 29, and a wooden block 32 is secured to the under side of the lever and is adapted to slide upon the portion A' of the frame.

The action of the brake is as follows: As the plunger 14 comes back on its rearward stroke, it strikes the spring-plate 21 on the lever 19 and forces the latter back, and shoving the lever 29 and friction block 32 therewith. The friction of the block 32 on the frame A' is sufficient to cause the lever 19 to press against the plunger with sufficient resistance to brake its backward movement. A suitable stop is provided in the baling-box against which the plunger-head 15 is brought to rest.

The baling-box or press, represented at 33, constitutes one of the essential parts of this invention and is constructed in the following manner: The top panel 34 and one side panel 35 of the feed chamber are suitably hinged together at their intersection, and the side 35 is hinged to the bottom of the box in such manner that both the top 34 and side 35 may be swung outward and be extended upon the ground in the position shown in Figs. 4 and 5. A cable 36 is secured to the top panel 34, and after passing around suitable direction pulleys, leads to and is secured to the lever-arm 25 at a suitable point. A spring 37 is fastened to the edge of the top panel 34 and extends back to a fixed point on the ground, usually a stake, not shown, and normally tends to retain the top 34 and side 35 in their open position. A catch 38' is adapted to engage the top 34 and retain it in a closed position, while the plunger-head 15 moves forward across the feed chamber and to be released by an engagement with a lug 14' on the plunger 14 as soon as the head 15 has passed the feed chamber 33' and is entering the compressing chamber 38.

The operation of the invention is as follows: Power being applied to the shaft 3 through the sweep 5 in the usual manner, the cross-heads 6—16 are caused to rotate and act upon the plunger 14 and lever-arm 25, as before described. When the plunger-head has just left the feed chamber and is entering the compressing box 38, the projection 14' on the plunger 14 engages a hook 39 on a line leading to the catch 38' and causes the latter to release the top panel 34 which is immediately opened out upon the ground, as before mentioned. Sufficient hay or the like, to form a flake, is then placed upon the extended portions 34—35 while the plunger is completing its forward stroke in the compressing box 38. When the stroke of the plunger is completed, the roller 7 or 7' on the cross-head contacts the curved arm and starts to pull back upon the plunger 14 through the cable 26 and simultaneously lifts up the extended top 34 and side 35, as shown in Fig. 5, thereby gathering up the materials thereon and carrying them forward, as the piston-head 15 is moved back across the feed chamber 33'. As the plunger-head 15 comes to rest, clear of the feed chamber, the curved arm 25 continues on sufficiently far to completely close the top and side of the feed chamber, thus delivering the material into the baler in front of the plunger-head 15, the top 34 being then engaged by the catch 38'. The spring 27 allows the arm 25 to pull the top panel 34 into engagement with the latch 38' irrespective of the plunger 14. The materials to be compressed are now inclosed in the feed chamber 33' and in position to be acted upon by the next forward movement of the plunger-head 15.

A shield or cover 40 extends over the feed chamber 33', as shown in Fig. 5, so as to direct the materials on the foldable extended portions 34—35 into the feed chamber.

When the plunger 15 has passed across the feed chamber 33', compressing the hay therein into the compressing box 38 as far as the cross-head 6 carries it, the short cross-head 16 acts upon the plunger and gives the already compressed body of material an additional compression, thereby forming the material in a compact flake.

From the foregoing it will be seen that the machine will be constantly at work, while in motion, the cross-heads 6—16 bearing continuously either in carrying the plunger forward or bringing it back and delivering the materials into the feed chamber. By this arrangement the pull upon the sweep 5 is equalized, thereby making the operation of the machine easier for the draft animals.

Having thus described my invention, what I claim and desire to secure by Letters Patent, is:

1. In a baling press, a baling box, a feed chamber in said box having hinged top and side panels adapted to be extended in a substantially horizontal open position, and means for normally retaining said panels in the extended position.

2. In a baling press, a baling box having a feed chamber, a hinged side panel, a top panel hinged to said side panel, means for normally extending said panels in a horizontal position, and means for automatically causing said top and side panels to inclose said feed chamber.

3. In a baling press, a feed chamber having a hinged side and top panel, a spring for normally retaining said side and top panels in an open extended horizontal position, means for automatically closing said panels, and means for retaining said panels in closed position in opposition to said spring.

4. In a baling press, a feed chamber, hinged, connected extensible top and side panels, adapted to inclose said feed chamber, means for normally extending said top and side panels, means for automatically inclosing said feed chamber with said panels, a catch to retain said panels in the closed position, and means for operating said catch to release the panels.

5. In a baling press, a baling box, a feed chamber with hinged top and side panels adapted to be extended to receive the material to be baled, means for automatically lifting said panels so as to deposit the material in said feed chamber, means for retaining the panels in a position to inclose said feed chamber, means for compressing the material in said baling box, means for releasing said panels, and means for extending said panels in a horizontal position.

6. In a baling press, a baling box having a feed chamber with a side panel hinged to the bottom thereof, a top panel hinged to the upper edge of said side panel, said top and side panels adapted to swing on their hinged connections so as to extend in a horizontal position to one side of said feed chamber, a spiral spring to normally retain said panels in said position, a lever arm, a cable connecting the top panel therewith, means whereby said lever-arm is oscillated so as to pull said top and side panels to a closed position.

7. In a baling press, a baling box having a feed chamber with a side panel hinged to the bottom thereof, a top panel hinged to the upper edge of said side panel, said top and side panels adapted to swing on their hinged connections so as to extend in a horizontal position to one side of said feed chamber, a spiral spring to normally retain said panels in said position, a lever arm, a cable connecting the top panel therewith, means whereby said lever-arm is oscillated so as to pull said top and side panels to a closed position, a catch to engage said panels, and means for operating said catch to release said panels.

8. In a baling press, a baling box having a feed chamber with a side panel hinged to the bottom thereof, a top panel hinged to the upper edge of the side panel, said top and side panels being adapted to swing outward and extend in a horizontal position so as to receive the material to be baled, a lever arm, a cable connecting the top panel to the lever arm, means whereby said lever-arm is oscillated so as to pull the panels to a closed position, and thereby deposit the materials in the feed chamber, means for retaining the panels in the closed position so as to inclose the feed chamber, a plunger to compress the materials in the feed chamber and baling box, means on said plunger for releasing the panels, means to automatically extend the panels into a horizontal position, and means whereby the plunger is reciprocated.

9. In a baling press, a baling box having a feed chamber with a hinged side panel, a top panel hinged to the upper edge of said side panel, means for normally retaining the panels in an extended horizontal position, a lever arm, a cable connecting said panels to the lever arm, a revoluble cross-head by which said lever arm is oscillated, means for rotating said cross head, a reciprocating plunger, means by which said plunger is actuated by the cross head.

10. In a baling press, a baling box having a feed chamber with a hinged side panel, a top panel hinged to said side panel, means for extending said panels horizontally, a lever arm, means for connecting said panels to said lever arm, a revoluble cross-head by which the lever arm is actuated, means whereby said cross head is rotated, a plunger, intermediate means whereby the plunger is reciprocated by the cross-head, an auxiliary cross head, and means whereby said plunger is moved forward by said auxiliary cross-head.

11. In a baling press, a baling box having a feed chamber with a hinged side panel, a top panel hinged to said side panel, means for automatically extending said panels, a lever arm, means for connecting said panels to the lever arm, a cross-head by which said lever arm is actuated, a toggle link, a cam on said toggle link adapted to be engaged by the cross head, a reciprocable plunger, and a push-beam connecting said toggle link to said plunger.

12. In a continuous baling press, a hinge-connected side and top, mechanism by which said members may be extended horizontally to receive a charge, mechanism by which said members may be successively folded and latched to inclose the charge, a follower or plunger adapted to reciprocate within the press box, and mechanism by which said plunger may be advanced by movements combining retarded speed and increased power.

13. The combination in a baling press, of a plunger, a revoluble cross head, means for rotating said cross head, intermediate means whereby said plunger is reciprocated by said cross head, an auxiliary cross head rotatable and integral with said revoluble cross head, and means on the plunger directly engaged by the auxiliary cross-head whereby the length of the forward stroke of said plunger is increased.

14. The combination in a baling press, of a plunger, a revoluble cross head, means for rotating said cross head, intermediate means whereby said plunger is reciprocated by said cross head, an auxiliary cross head rotatable and integral with said revoluble cross head, means on the plunger directly engaged by the auxiliary cross-head whereby the length of the forward stroke of said plunger is increased, and means for retarding the backward movement of said plunger.

In testimony whereof I have hereunto set my hand in the presence of two subscribing witnesses.

GUSTAF W. PEARSON.

Witnesses:
G. W. SMITH,
W. H. PULESTON.